(12) United States Patent
Wang et al.

(10) Patent No.: US 6,535,321 B2
(45) Date of Patent: Mar. 18, 2003

(54) THIN FILM FERROELECTRIC LIGHT MODULATORS

(75) Inventors: Feiling Wang, Medford, MA (US); Gene H. Haertling, Albuquerque, NM (US)

(73) Assignee: Corning Applied Technologies Corporation, Woburn, MA (US)

( * ) Notice: Subject to any disclaimer, the term of this patent is extended or adjusted under 35 U.S.C. 154(b) by 0 days.

(21) Appl. No.: 10/053,862

(22) Filed: Jan. 22, 2002

(65) Prior Publication Data

US 2002/0141031 A1 Oct. 3, 2002

Related U.S. Application Data

(63) Continuation of application No. 09/798,136, filed on Mar. 2, 2001, now Pat. No. 6,411,422, which is a division of application No. 09/420,475, filed on Oct. 19, 1999, now Pat. No. 6,211,993, which is a continuation of application No. 09/207,548, filed on Dec. 8, 1998, now abandoned, which is a continuation of application No. 08/859,432, filed on May 20, 1997, now abandoned

(60) Provisional application No. 60/017,961, filed on May 20, 1996.

(51) Int. Cl.[7] .............................. G02F 1/07; G02F 1/00; G02B 1/10

(52) U.S. Cl. ...................... 359/260; 359/245; 359/246; 359/323; 359/586; 359/589; 372/26; 372/36; 428/212; 428/472

(58) Field of Search ................................. 359/260, 251, 359/255, 256, 245, 246, 322, 323, 579, 586, 589; 428/212, 472; 372/20, 26, 32, 36, 18; 257/21, 25

(56) References Cited

U.S. PATENT DOCUMENTS 3,357,771 A 12/1967 Buhrer ....................... 350/160
3,758,194 A 9/1973 Daval et al. ................. 350/160
3,873,187 A 3/1975 Brooks ..................... 350/160 R (List continued on next page.)

FOREIGN PATENT DOCUMENTS

RU 526844 11/1976 ............. G02F/1/31

OTHER PUBLICATIONS

Wang, F. et al., "Large Electrooptic Modulation Using Ferroelectric Thin Films in a Fabry–Perot Cavity," *Proc. Ninth IEEE Int. Symp. On Applications of Ferroelectrics*, pp. 683–686, Aug. 7–10, 1994.

(List continued on next page.)

*Primary Examiner*—Loha Ben
(74) *Attorney, Agent, or Firm*—Hamilton, Brook, Smith, & Reynolds, P.C.

(57) ABSTRACT

A solid state device used to modulate the intensity of reflected or transmitted light by modulating with an external voltage the optical thickness of a thin film ferroelectric placed in an etalon cavity is disclosed. The device is constructed by selecting a generally planar supporting substrate, preferably silicon or sapphire in order to be compatible with silicon integrated circuits. A dielectric stack consisting of alternating layers of different index of refraction materials, also specifically selected to be compatible with later growth of the thin film ferroelectric, is deposited thereon to form a partially reflective and partially transmitting mirror, followed by a transparent electrically conductive layer. The thin film ferroelectric is deposited on the conductive layer, followed by a second transparent conductive layer and a second dielectric stack. Leads are connected to the conductive layers and in turn to a voltage generator. In one version of the invention, the functions of both the second (top) electrically conductive layer and dielectric stack are fulfilled by using a semi-transparent conducting film. In another version, the functions of both the first (bottom) electrically conductive layer and dielectric stack are also fulfilled by using a, preferably, highly reflective conducting film.

20 Claims, 4 Drawing Sheets

U.S. PATENT DOCUMENTS

| | | | |
|---|---|---|---|
| 4,379,621 A | 4/1983 | Ikedo et al. | 350/392 |
| 4,525,687 A | 6/1985 | Chemla et al. | 332/7.51 |
| 4,630,040 A | 12/1986 | Haertling | 340/763 |
| 4,636,786 A | 1/1987 | Haertling | 340/783 |
| 4,779,959 A | 10/1988 | Saunders | 350/346 |
| 4,786,128 A | 11/1988 | Birnbach | 350/96.14 |
| 4,790,634 A | 12/1988 | Miller et al. | 350/347 |
| 4,790,635 A | 12/1988 | Apsley | 350/356 |
| 4,990,943 A | 2/1991 | Phillips | 350/392 |
| 5,037,169 A | 8/1991 | Chun | 385/16 |
| 5,085,503 A | 2/1992 | Osugi et al. | 359/246 |
| 5,168,383 A | 12/1992 | Iwaki et al. | 359/71 |
| 5,212,584 A | 5/1993 | Chung | 359/260 |
| 5,221,989 A | 6/1993 | Stappaerts et al. | 359/323 |
| 5,315,430 A | 5/1994 | Brennan et al. | 359/248 |
| 5,381,253 A | 1/1995 | Sharp et al. | 359/53 |
| 5,408,353 A | 4/1995 | Nichols et al. | 359/275 |
| 5,414,726 A | 5/1995 | Raj et al. | 372/26 |
| 5,425,115 A | 6/1995 | Wagner | 385/16 |
| 5,426,312 A | 6/1995 | Whitehead | 257/21 |
| 5,448,396 A | 9/1995 | Fukushima | 359/257 |
| 5,570,213 A | 10/1996 | Ruiz et al. | 359/72 |
| 5,637,883 A | 6/1997 | Bowman et al. | 257/21 |
| 5,664,032 A | 9/1997 | Bischel et al. | 385/4 |
| 5,768,003 A | 6/1998 | Gobeli | 359/254 |
| 6,211,993 B1 | 4/2001 | Wang et al. | 359/260 |
| 6,411,422 B2 * | 6/2002 | Wang et al. | 359/260 |

OTHER PUBLICATIONS

Wang, F. et al., "Integrated reflection light modulator using ferroelectric films on silicon," *Conf. On Lasers and Electro–Optics* (CLEO 95), p. 302, Baltimore, May 22–26, 1995.

Kewen, K. Li, et al., "An Automatic Dip Coating Process for Dielectric Thin and Thick Films," *Integrated Ferroelectrics*, vol. 3, Gordan and Breach Science Publishers, 1993, pp. 91.

Wang, F., et al., "Electro–optic measurements of thin–film material by means of reflection differential ellipsometry," *J. Appl. Phys.* vol. 78, No. 1, Jul. 1, 1995, pp. 9–15.

* cited by examiner

THIN FILM FERROELECTRIC LIGHT MODULATORS

RELATED APPLICATIONS

This application is a continuation of application Ser. No. 09/798,136, filed on Mar. 2, 2001, now U.S. Pat. No. 6,411,422, which is a divisional of application Ser. No. 09/420,475, filed Oct. 19, 1999, now U.S. Pat. No. 6,211,993, which is a continuation of application Ser. No. 09/207,548, filed Dec. 8, 1998, now abandoned which is a continuation of application Ser. No. 08/859,432, filed May 20, 1997, now abandoned which claims the benefit of provisional application Ser. No. 60/017,961, filed May 20, 1996, the entire teachings of all of which are incorporated herein by this reference.

GOVERNMENT SUPPORT

The invention was supported, in whole or in part, by a grant No. N0014-91-J-1508 from Office of Naval Research. The Government has certain rights in the invention.

BACKGROUND OF THE INVENTION

1. Technical Field

The invention is in the field of electro-optic modulators of light wave intensity. More particularly, the invention relates to using thin film ferroelectric materials in a Fabry-Perot etalon to provide polarization-insensitive modulation of reflected and transmitted light at high modulation frequencies.

2. Related Art

A number of methods or devices have been proposed to modulate the intensity of light. Most of them are not suitable for producing useful large-scale hybrid, integrated-with-silicon, circuits. The closest related art to the present invention uses ferroelectric materials whose indices of refraction change when an electric field is applied, but at a different rate for different light polarizations. That is, the ordinary and the extraordinary index change at a different rate with applied voltage, i.e., a field induced birefringence occurs. This structure is similar to an asymmetric Fabry-Perot etalon with a back surface reflecting electrode and a front surface partially transmitting electrode. Light which has been linearly polarized so that it has equal amplitude p-waves parallel to the incident plane and s-waves perpendicular to the incident plane are incident on and, after undergoing multiple reflections inside, reflected by the etalon. The reflected light is passed through a second linear polarizer which is used as an analyzer. In the absence of an electric field applied to the ferroelectric material, the intensity of the light exiting the second polarizer will be a function of several parameters including the type and thickness of the ferroelectric material and the reflectivity of electrodes. When an electric field is applied to the ferroelectric material, the relative optical phase of the p- and s-waves will be changed such that the intensity of light exiting the second polarizer will change. At the proper angle of incidence, the large field-induced birefringence in some ferroelectric materials, makes it possible to obtain a large ratio between light intensities with and without an electric field.

Transmission mode devices have been proposed using coplanar electrodes on PLZT plates. To reduce the high driving voltage, laminar assemblies with buried combs of electrodes have been proposed. All of these approaches have one major disadvantage. The light must be linearly polarized by a first polarizer, resulting in a 50% loss in light intensity for unpolarized light, and a second polarizer used to detect the intensity modulation. Accordingly, it is one object of the present invention to produce a modulator which does not require polarized light.

Other related devices include U.S. Pat. No. 4,786,128 to Birnbach, issued Nov. 22, 1988, which discloses a dielectric mirror comprised of a stack of alternating layers of non-electro-optic dielectric material and electro-optic material of a different index. Preferably, the stack contains nine to eleven layers for the well known reason that more layers yield higher reflectivity, here, 95%. However, in order to avoid large voltages, the voltage applied to the electro-optic material must be transverse necessitating depositing an electrode with its index of refraction matched to the index of the non-electro-optic material. Manufacturing may be costly and the need to make electrical contact to a vertical stack of electrodes may make it hard to produce as a hybrid integrated circuit.

U.S. Pat. No. 5,037,169 to Chun, issued Aug. 6, 1991, discloses a Fabry-Perot etalon with a compound semiconductor, for example, aluminum gallium arsenide. This can be used as an optical switch by changing the index of refraction in a variety of ways including optical pumping, using an external control voltage, injection of electric current, and temperature ramping. Because an appreciable index change occurs only for light wavelengths in the vicinity of the absorption band of the semiconductor materials, modulators of this kind are limited to a narrow range of wavelengths in the near infrared. Moreover, this device seems to be limited in useable angles of incidence.

U.S. Pat. No. 5,425,115 to Wagner, issued Jun. 13, 1995, discloses a polarization insensitive optical switch using liquid crystal material in the cavity of a Fabry-Perot etalon which uses dielectric mirrors. This device can overcome the limitation on light wavelengths, but liquid crystal response times are inherently slow and PLZT was also proposed. While it is not too difficult to insert liquid crystal material into a cavity or use a polished PLZT plate sandwiched between the dielectric mirrors, neither device is easily made part of a hybrid integrated circuit and, as noted, the PLZT driving voltage will be high. Moreover, the free spectral range will be narrow and the requirements on light collimation high. Low voltages, desirable with hybrid integrated circuits using PLZT, requires the deposition of thin films on dielectric mirrors which was heretofore unknown.

Accordingly, objects of the current invention are to produce a device which can modulate the intensity of unpolarized monochromatic light of any wavelength from the visible to mid-infrared without requiring polarizers while having a low operating voltage, a wide modulation bandwidth, viz., dc to about one GHz, and can be produced as a hybrid integrated circuit at low cost.

SUMMARY OF THE INVENTION

A solid state device, which is similar to a Fabry-Perot etalon, is used to modulate the intensity of reflected or transmitted light by modulating with an external voltage the optical thickness of a thin film ferroelectric placed in an etalon cavity. The device is constructed by selecting a generally planar supporting substrate, preferably silicon or sapphire in order to be compatible with silicon integrated circuits. A dielectric stack consisting of alternating layers of different index of refraction materials, also specifically selected to be compatible with later growth of the thin film ferroelectric, is deposited thereon to form a partially reflective and partially transmitting mirror, followed by a transparent electrically conductive layer. The thin film ferroelectric is deposited on the conductive layer, followed by a second transparent conductive layer and a second dielectric stack. Leads are connected to the conductive layers and in turn to a voltage generator. In one version of the invention, the functions of both the second (top) electrically conductive layer and dielectric stack are fulfilled by using a semi-transparent conducting film. In another version, the functions of both the first (bottom) electrically conductive layer and dielectric stack are also fulfilled by using a, preferably, highly reflective conducting film.

The devices can use low voltages to control the reflected and, in some versions transmitted, intensity of incident light beams at high frequencies in a continuous manner. The light wavelenghs are not limited to a narrow range, but, with present materials can cover the near ultra-violet to the near-infrared. Further, being able to use thin film techniques to make the ferroelectric material as opposed to starting with the only previously available bulk ceramic plates, should make production of hybrid integrated circuits practical, including the possibilities of making cost-effective arrays.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
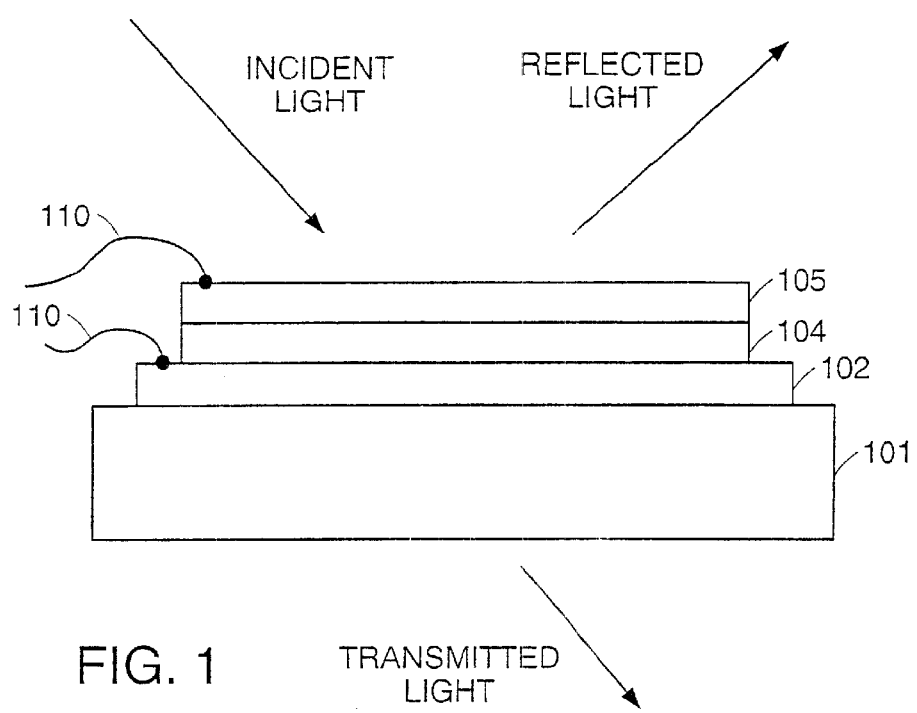
FIG. 1 illustrates the basic structure of the invention.

FIG. 1 illustrates the basic structure of one version of the invention. (All structural figures are shown in cross-section with like functions having the same reference numerals. The drawings are not to scale and the light beam diameters are non-zero. Herein, for brevity and in conformance with an integrated circuit perspective, "top" means the side of the structure on which a light beam is incident and may be reflected and "bottom" means the opposite side from which a light beam may emerge.) The substrate 101 may be any on which the remainder of the structure may be grown but for use with integrated circuits is preferably silicon or sapphire. The bottom electrode 102 may be any conductive material which reflects light on which a ferroelectric may be grown. Preferably it is a metal such as platinum because it is one of the easiest on which to grow ferroelectric materials. The thin film ferroelectric 104 may be any which exhibits an electro-optic effect such that the index of refraction changes or a piezoelectric effect such that the thickness changes when an electric field is applied. Lead lanthanum zirconium titanate (PLZT) is a good choice because it has high electro-optic coefficients and is not too hard to grow as a thin film. The top electrode 105 must be both conductive and reasonably transparent to the light. Indium Tin Oxide (ITO) is a material which is transparent to visible light, conductive and can be deposited on ferroelectrics. Thin metal films may also be used. Lead wires 110 may be attached by any of several well known methods.

In the invention, when ITO is used as the top electrode layer, it must be thick compared to the wavelength of light in order to be sufficiently conductive. In this case, multiple reflections occur within the ITO layer itself and the overall structure is considerably more complicated than the case for a classical Fabry-Perot etalon. Intuitively, the structure may be regarded as a Fabry-Perot reflector whose finesse can be controlled by the interference of the light inside its top electrode (ITO layer). Thus, depending on the choice of the ferroelectric material and the bottom electrode material, this extra complication can be used to enhance the performance of the device. This will be shown using a more precise analytic description of the invention using ITO, PLZT, and platinum as material examples.

For the incident light beam, multiple reflections of light occur at the three interfaces: air-ITO, ITO-PLZT and PLZT-Platinum. Therefore, the thin film structure shown in FIG. 1 can be treated as two coupled oscillators. For a given incident angle, the reflectance of the thin film structure depends not only on the phase thickness of the ferroelectric layer, $\beta_2$, but also on that of the ITO layer, $\beta_1$. It can be shown that the complex reflectance of the thin film structure is given by the following equation:

$$\tilde{R} \equiv \mathrm{Re}^{-j\tau} = \frac{(r_{01} + r_{12}e^{-j2\beta_1}) + (r_{01}r_{12} + e^{-j2\beta_2})r_{23}e^{-j2\beta_2}}{(1 + r_{01}r_{12}e^{-j2\beta_1}) + (r_{01}r_{12} + e^{-j2\beta_1})r_{23}e^{-j2\beta_2}} \quad (1)$$

where $r_{01}$, $r_{12}$ and $r_{23}$ are the individual Fresnel reflection coefficients for boundaries between air-ITO, ITO-PLZT and PLZT-Platinum layers respectively. Because of the electrical conduction of the electrode layers, all the Fresnel reflection coefficients are complex quantities, in general. The phase thickness, $\beta_1$, and $\beta_2$ for the ITO and PLZT layer are given by the following equation:

$$\beta_1 = \frac{2\pi h_1 n_1}{\lambda}\cos\theta_1, \beta_2 = \frac{2\pi h_2 n_2}{\lambda}\cos\theta_2 \quad (2)$$

where $\theta_1$ and $\theta_2$ are the refraction angles of the light in medium 1 (ITO) and medium 2 (PLZT), whose thicknesses are $h_1$, and $h_2$, indices of refraction are $n_1$, and $n_2$, respectively and $\lambda$ is the wavelength of the light.

Due to the interference of the multiply reflected partial light beams, the reflectance of the thin film system exhibits periodic variations as a function of the thickness of the PLZT layer and that of the ITO layer. It can be shown that reflectance minima of the thin film system occur when the round-trip phase thickness of the ITO layer, $2\beta_1$, equals an odd integer of $\pi$ while the round-trip phase thickness of the PLZT layer, $2\beta_2$, equals an even integer of $\pi$. Because of the complex Fresnel reflection coefficients for the thin film system, the phase shifts of the reflections at the three interfaces should be included in the phase thicknesses, $2\beta_1$, and $2\beta_2$. Under these conditions, the thin film system behaves like an optical resonator where the PLZT layer is sandwiched between the bottom platinum mirror and the top ITO mirror whose reflectivity for a light of resonating wavelength is enhanced by the interference of the multiple reflections. It can be shown that an extinction of the reflected light occurs when the Fresnel reflection coefficients for the three interfaces satisfies the following relation:

$$r_{12}(1-r_{01}r_{23})=r_{23}-r_{01} \quad (3)$$

This means that the materials of the top electrode, the ferroelectric, and the bottom electrode must be selected to satisfy this condition in order to achieve a zero minimum. This selection cannot always be accomplished in practice. However, fortuitously, an ITO-PLZT-platinum combination produces a low enough minimum reflectance to be useful.

In the thin film system illustrated in FIG. 1, near extinction of the reflected light can be achieved. (In general, the incident light is transmitted into the substrate and either transmitted out the bottom or absorbed depending on the absorption characteristics of the substrate material. However, when a useful thickness of platinum is used for the bottom mirror/electrode, the light will be absorbed by it.) The mechanism for the light intensity modulations using the invention involves the tuning of $2\beta_2$ into or away from a resonant condition. In the presence of an external electric field, exerted on the PLZT by applying a voltage between the ITO and Platinum electrodes, the electro-optic effect causes a change in the index, $n_2$, and the piezoelectric/electrostrictive effect causes a change in the thickness, $h_2$, causing a change in the phase thickness, $\beta_2$.

With a non-zero incident angle, the Fresnel reflection coefficients are, in general, different for incident lights polarized in the two principal directions (s- and p-waves). Therefore, in general, the modulation of the reflected light is polarization dependent. However, if the incident angle of the light is sufficiently small, the difference in the Fresnel reflection coefficients between the two polarized light waves vanishes and the performance of the modulator becomes independent of the polarization state of the light. In this case, the modulation of the light relies on the longitudinal electro-optic effect, that is, the index change for light propagating along the direction of the electric field caused by an externally applied voltage. For a typical ferroelectric thin film material, this change in index is on the order of 0.01. The piezoelectric/electrostrictive effect of the ferroelectric film also contributes to the modulation. The polarization-insensitivity of the current invention at small angles enables the use of non-polarized light, eliminating both polarizers.

Even when the light is incident at large angles, the invention will modulate unpolarized light but the ratio of minimum to maximum intensity will not be as large as for normal incidence. This is because the optimum angle of incidence will not be the same, in general, for the s and p polarizations. However, if a linear polarizer is used on the incident light, effective modulation can be achieved without the need for a polarizer on the reflected light.

The following examples illustrate the invention for both large and small angles.

WORKING EXAMPLE #1

Using well known sputtering techniques, the structure of FIG. 1 was produced with a silicon substrate, platinum bottom electrode, 480 nm (0.758 wavelengths) thick PLZT layer, and 124 nm (0.197 wavelengths) thick ITO top electrode. A helium-neon 632.8 nm laser was incident at an angle around 54° from the normal which was the angle which satisfied the conditions for resonance. The light was polarized perpendicular to the plane of incidence (s polarization) only. However, no polarizer was used as an analyzer on the reflected beam before it entered a photo multiplier light detector (PMT).

Figure 2:
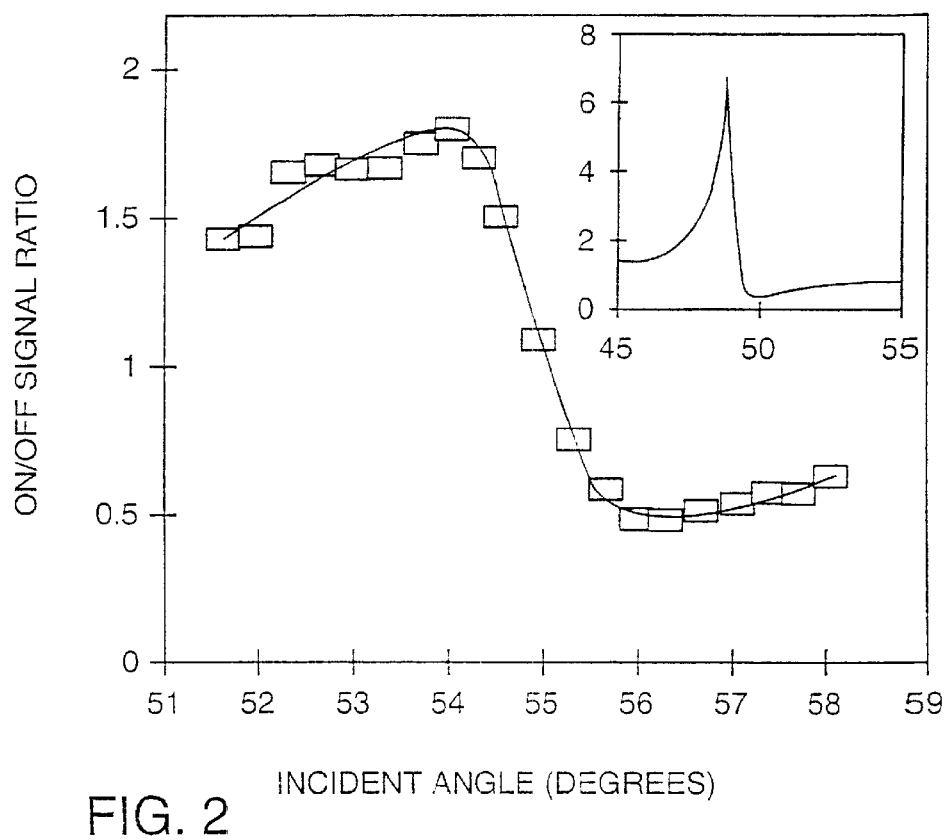
FIG. 2 shows experimental results for modulation of light incident at large angles.

The light was made to be incident at slightly different angles, and the PMT signal was measured with 10 volts applied (the "off" condition) or not applied (the "on" condition) across the PLZT film. The results are shown in FIG. 2. At an angle of 54°, a ratio of 1.8 for on and off intensities could be obtained and a ratio of 2.5 with higher voltages. At 54°, there is no difference; but at larger angles, the ratios are inverted and almost as good.

The insert shows a theoretical calculation which has the same general shape but is shifted to lower angles and indicates a large ratio at a certain optimum angle and ratios near unity at higher angles. The difference between theory and experiment can most likely be explained by inaccurate assumptions about the thickness of the ITO or PLZT film thicknesses and variations in them. If the thickness varies, then the resonances will not be as sharp and the ratios not as high.

The large angle was used because this is the angle typically selected for use with the birefringent method. However, once it is possible to modulate the intensity without the use of a polarizer on the reflected beam, even if only for a single polarization, it becomes obvious that, for normal incidence, completely unpolarized light may be modulated, as the next example shows.

PROPHETIC EXAMPLE #1

Figure 3:
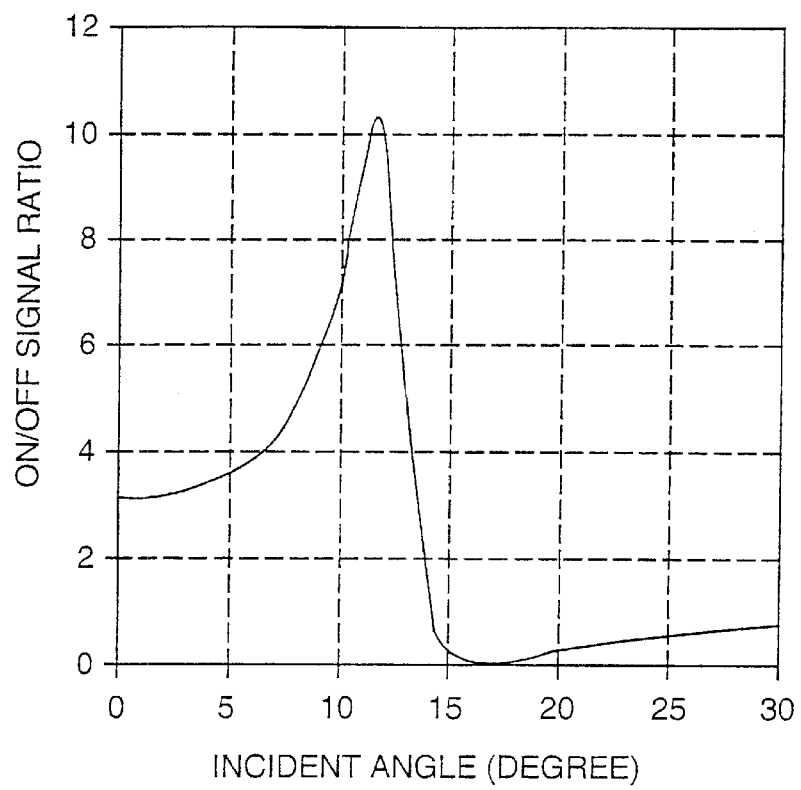
FIG. 3 shows theoretical predictions for the modulation of light incident at small angles.

As the angle of the incident light approaches the normal to the structure, the difference between s and p-wave reflections approaches zero. In this case, one may use totally unpolarized light and still obtain a high ratio of on and off signals. FIG. 3 shows a theoretical calculation for small angles for unpolarized light with a 10 volt modulation voltage applied to the ferroelectric. This was for an ITO thickness of 0.25 wavelengths and a PLZT thickness of 1.278 wavelengths of the light. In general, using equation (1), an optimum thickness can be determined for the ITO and PLZT layers for any given incident angle and wavelength. The major limitation on the on/off ratio is the minimum off intensity which depends on how closely one can satisfy equation (3).

Figure 4:
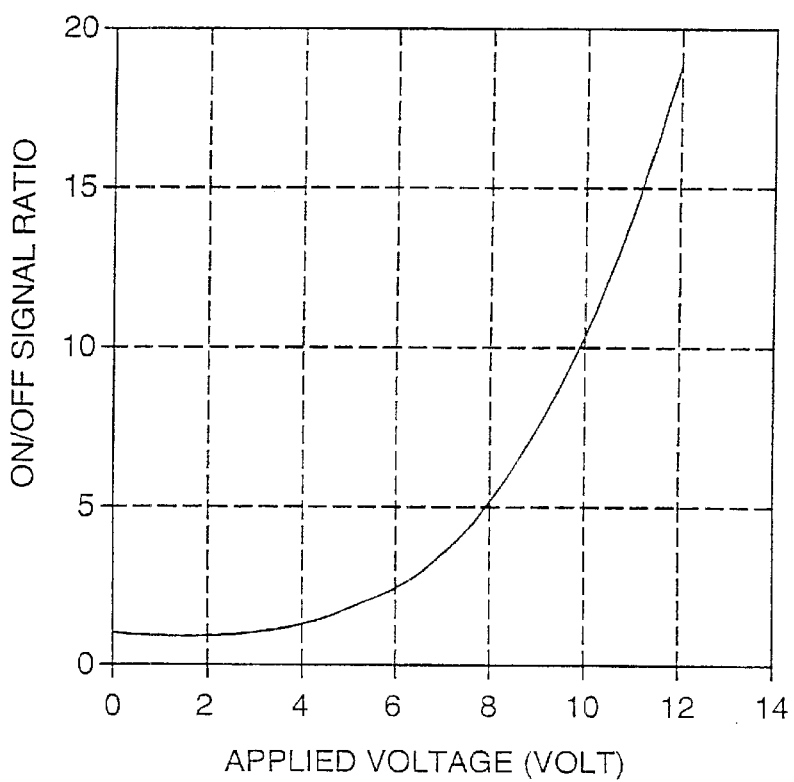
FIG. 4 shows theoretical predications for the ratio of maximum to minimum reflectance as a function of applied voltage.

Even though the modulator is not bistable but produces continuous modulation with applied voltage, it is convenient to measure modulation as the ratio of reflectance when some fixed voltage is applied and none. FIG. 4 shows the ratio of on to off intensities for different voltages.

WORKING EXAMPLE #2

Figure 5:
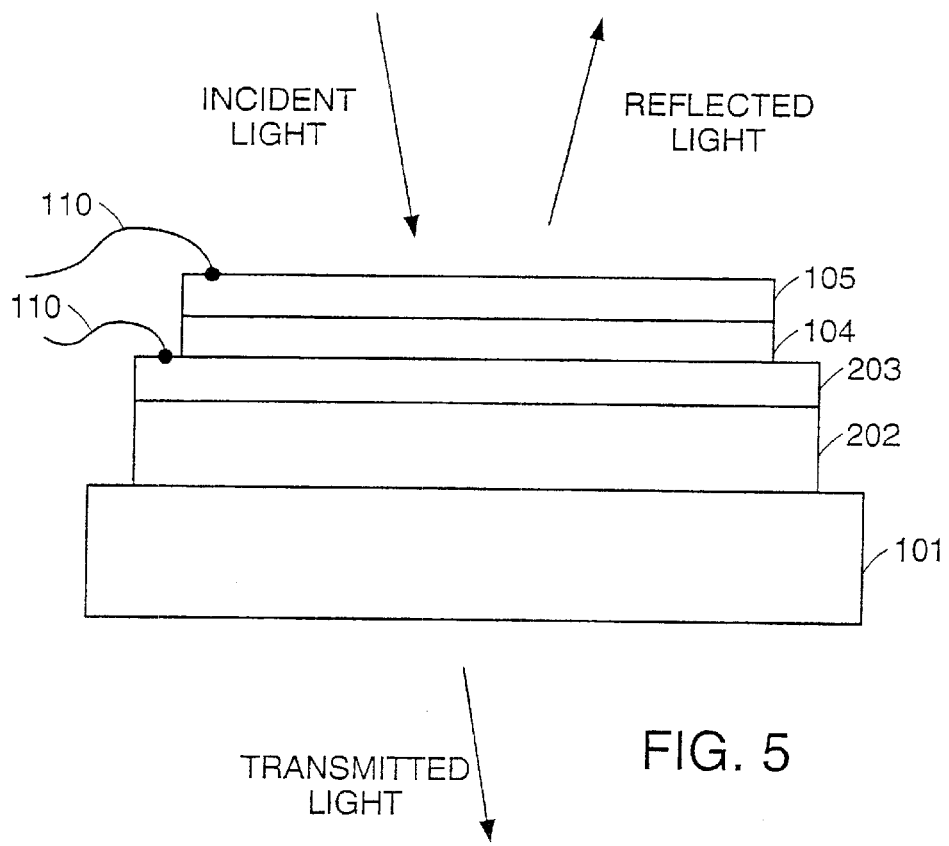
FIG. 5 illustrates a version of the invention using a dielectric mirror.

A device was constructed as illustrated in FIG. 5 wherein the bottom mirror/electrode 102 of FIG. 1 was comprised of a dielectric mirror 202 and conductive transparent layer of ITO 203. The use of a stack of layers of alternating index of refraction material to produce nearly perfect mirrors at selected wavelengths is well known, but producing crystalline thin film oxide ferroelectrics on such a dielectric mirror is believed to be unknown.

PLZT thin films can be made by a variety of methods. In this working example, one was made using the Metalorganic Chemical Liquid Deposition (MOCLD) process, K. K. Li, G. H. Haertling and W. -Y. Howng, "An Automatic Dip Coating Process for Dielectric Thin and Thick Films," Integrated Ferroelectrics, vol. 3, pp 81–91 (1993). Dip coating is an old art used for a variety of materials. As described in this reference for PLZT, a solution of acetate precursors of the constituents is prepared and a substrate is dipped, withdrawn, allowed to dry, and placed in a firing furnace with a temperature of 550–700° C. where the amorphous PLZT is converted to a crystalline film. The major problem encountered was to prevent cracking due to shrinkage when the organic solvents are removed during firing and thermal expansion mismatches between the film and substrate. This problem was solved by repetitively applying a large number of very thin films using an automated apparatus. The methods were applied to substrates of platinum-coated silicon wafers and glass among others.

Dielectric mirrors using different materials are commonly available from a number of commercial sources. However, the PLZT firing temperature requires a compatible substrate and dielectric mirror. This requirement was met by using single-crystal aluminum oxide ($Al_2O_3$, sapphire) as the substrate, coated with a thin amorphous layer of $Al_2O_3$ to enhance adhesion, and using alternating dielectric layers of $SiO_2$ and $Ta_2O_5$ to make the dielectric stack. This was supplied by Quality Thin Films, Inc. of Oldsmar, Fla., U.S.A. A sputtered ITO layer was used for the bottom electrode. Event though the substrate and dielectric materials have melting points over at least 1700° C., the supplier specifies a maximum operating temperature of 400° C. Indeed, in the first attempt to use it as supplied, the dielectric stack layers delaminated. This problem was solved by annealing the, as supplied, substrate, dielectric stack and ITO layer at 600° C. for about one hour after taking about two hours to heat up and then allowing about two hours to cool down.

Next, the MOCLD technique was used to deposit the electro-optic $(Pb_{1-x}La_x)(Zr_yTi_{1-y})O_3$ (PLZT) films, where the values of x and y were 0.09 and 0.65, respectively. Although generally known in the art, the technique will be described in more detail. It started with the preparation of a homogeneous chemical solution that consisted of precursors for the four cations ($Pb^{++}$, $La^{+++}$, $Z^{++++}$, $Ti^{++++}$) in PLZT. These precursors are lead subacetate, hydrated lanthanum acetate, zirconium acetate aqueous solution, and titanium di-isopropoxy bis acetylacetonate. They were mixed in an alcoholic solvent, methyl alcohol, but ethyl alcohol or 2-methoxyethanol could have been used. The solution preparation sequence is described as follows: Using the appropriate amounts of cations, hydrated lanthanum acetate was first dissolved into distilled water, and then mixed with zirconium acetate solution. Lead subacetate was then added and dissolved into this mixture of lanthanum and zirconium precursors. After the lead subacetate was completely dissolved, the alcoholic solvent and titanium di-isopropoxy bis acetylacetonate were then added and mixed to form a homogeneous solution with a concentration of 8 grams of oxide (PLZT) in 100 grams of solution.

This solution was applied to the substrate by dip-coating at 25° C. with a substrate withdrawing speed of about 3 mm/sec. The resulting film thickness from one application varied from 20 to 70 nm. Alternately, spin-coating could be used with a typical spinning speed of 3000 rpm and a spinning time of 30 seconds.

The desired final total film thickness, D, of the PLZT is one that produces an optical resonance. This occurs when the quantity, $nD\cos\theta$, is any integer multiple of half a wavelength, where n is the index of refraction and $\theta$ is the refracted angle in the PLZT. For test purposes, a helium-neon laser with a 632.8 μm wavelength incident from the air at 11° from the normal was convenient. The minimum film thickness is, therefore, on the order of 100 nm. Films of this thickness, however, tend to have reduced electro-optic coefficients due, possibly, to effects of the interfaces. Very thick films, e.g., greater than about 2 μm, are also hard to produce without cracking. In this case, as a compromise, ten half wavelengths was selected so that D should be 1.290 μm, as n=2.46 for this wavelength and composition of PLZT.

To achieve this total film thickness, the apparatus described by Li et al was constructed and used as in that reference. The firing temperature was about 700° C. for a duration of 2 minutes with heating and cooling periods of about 1 or 2 minutes. At the later stage of building up the film thickness, a more diluted chemical solution or a different set of processing conditions can be used to more gradually approach the designated film thickness. The just described method of making PLZT on dielectric stacks was disclosed in U.S. patent application Ser. No. 08/795,281, filed Feb. 4, 1997 in the name of Wang, now abandoned.

Figure 6:
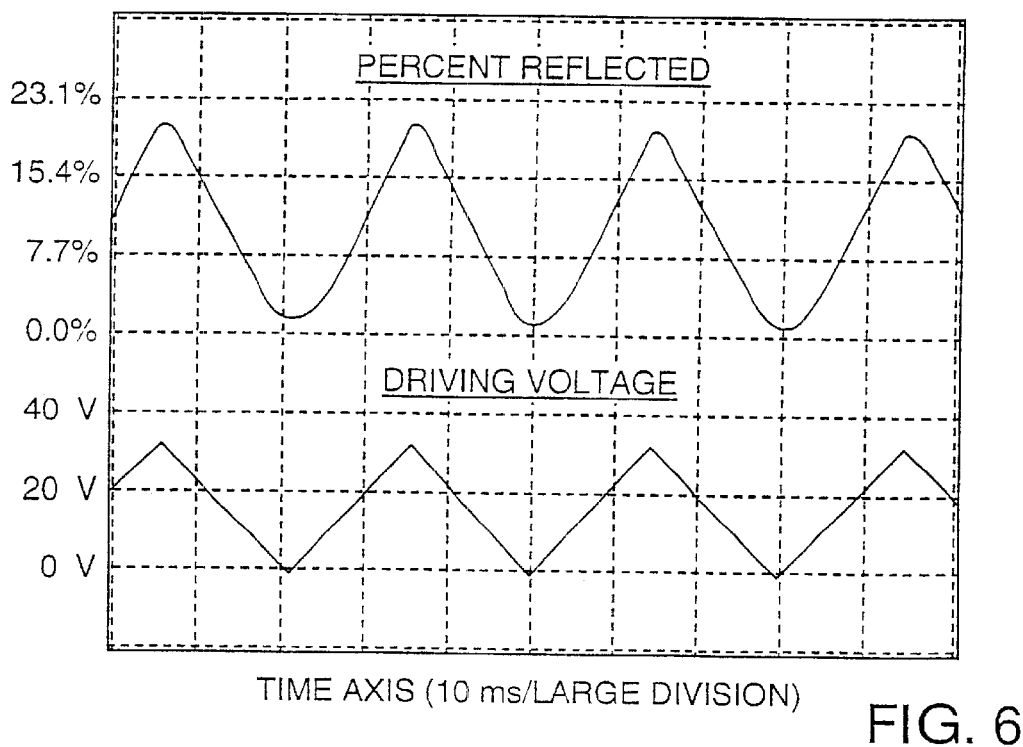
FIG. 6 shows experimental results for modulation of light incident at a small angle.

A thin gold layer was then sputter deposited on the resulting PLZT thin film. Electrode wires were attached to it and the ITO film and these in turn connected to an external voltage generator. At the small 11° angle, the s- and p-wave polarizations are similarly affected and no polarizers are needed. A low frequency sawtooth wave was applied and the amplitude of the reflected beam measured with the results shown in FIG. 6.

It should be noted that for this non-optimized version, only approximately 20% of the total incident light was reflected in the on-state of the modulator. However, this insertion loss compares favorably to the 25% maximum on-state of lithium niobate waveguide type polarization dependent switches when switching unpolarized light. Although absorption in the PLZT and imperfections in the resonant cavity can play a part, calculations show that the insertion loss is principally due to the gold top mirror/electrode that absorbed some light on each passage through it. As shown below, the use of dielectric mirror in place of the thin gold layer would drastically reduce the insertion loss. Even so, the off reflectivity was about 1%, indicating an on/off ratio of 20:1.

This version had an electrode area of 2 $mm^2$ so the capacitance of the film was about 50 nF. The ITO sheet resistance of the ITO layer was about 1 kΩ per square and so the RC time constant of was about 50 μs. In order to observe the inherent modulation characteristics of the test device, a low voltage excitation frequency was used. However, since the capacitance is proportional to the area, it can be reduced to the area of the modulated light beam. Moreover, for high frequency applications, it is well known how to produce ITO films with sheet resistances as low as 50Ω per square. Thus, for a 10 μm light beam diameter, an RC time constant on the order 0.1 ns could be achieved.

PROPHETIC EXAMPLE #2

Figure 7:
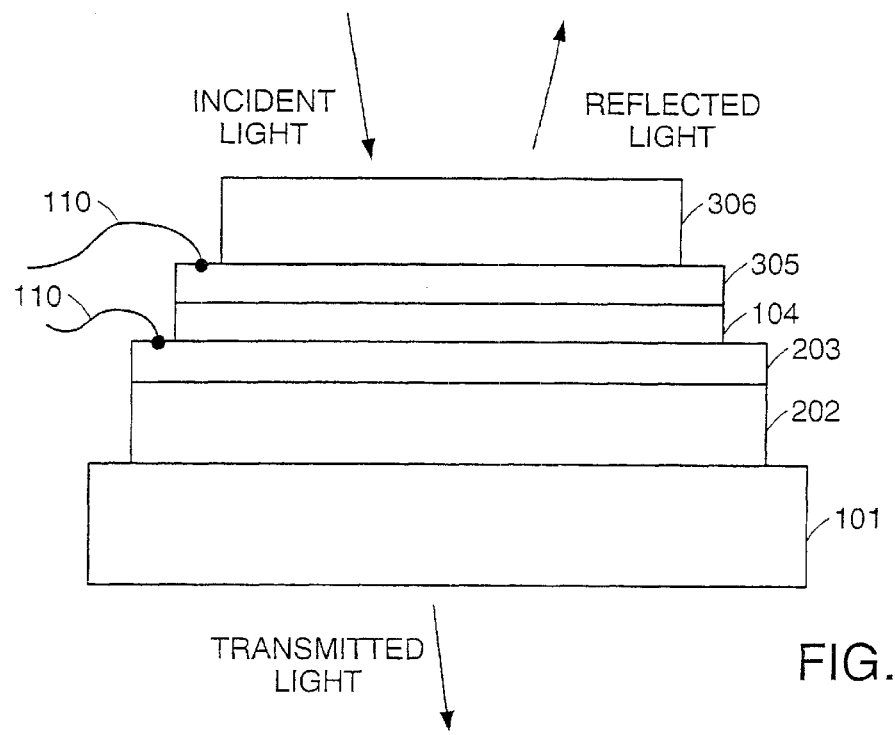
FIG. 7 illustrates a version of the invention using two dielectric mirrors.

As noted above, using a dielectric stack for the top mirror function as well as the bottom one, as shown in FIG. 7, should result in a major improvement over using gold for the top mirror/electrode. The figure illustrates a substrate 101, a bottom dielectric stack 202, a bottom transparent electrode 203, a ferroelectric film 104, a top transparent electrode 305, and a top dielectric stack 306. Alternating $SiO_2$ and $Ta_2O_5$ layers could be used for the top dielectric stack 306 as well as the bottom 202, but, since the ferroelectric film 204 is formed first, high temperature materials are not required for the top stack 306 and others maybe more convenient.

As is well known, the reflectivity of a dielectric stack increases with the number of layers in a predictable manner.

Figure 8:
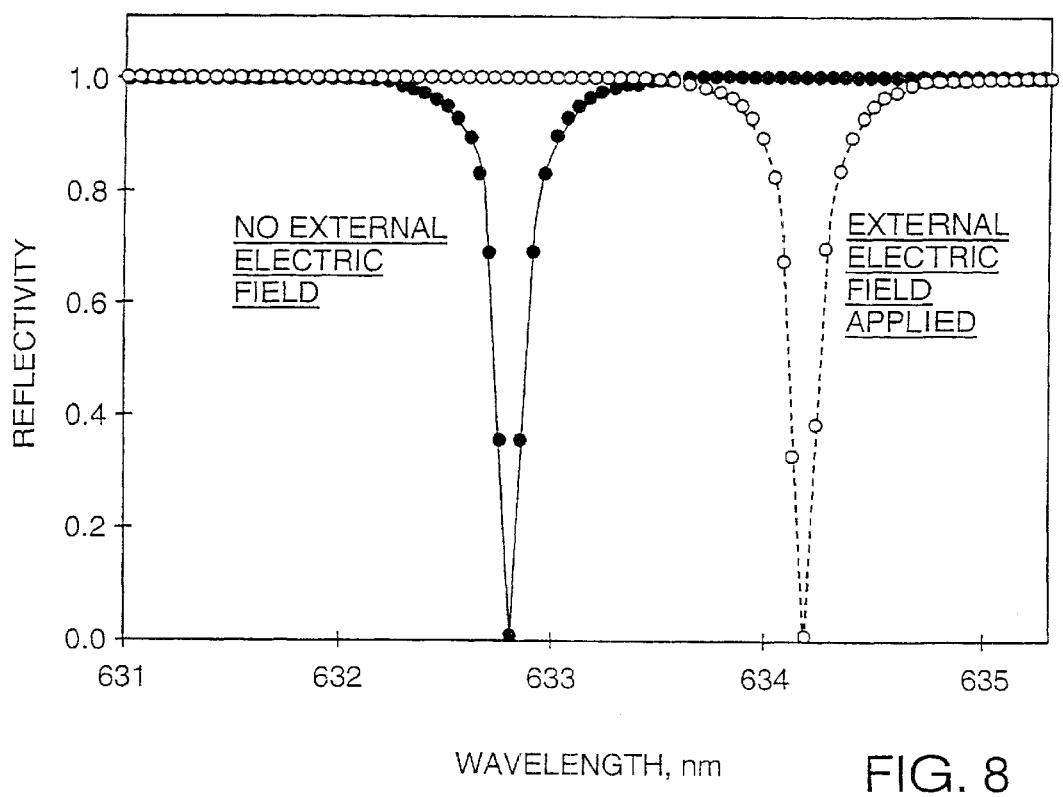
FIG. 8 shows calculations of reflectivity versus wavelength for two different values of refractive index.

In this calculation, enough were chosen so that, coupled with the ITO electrodes, the combination possessed a reflectivity of 98.9%. Using such a combination for both the top and bottom mirror/electrodes, the expected reflection as a function of wavelength was calculated for the PLZT film in the working example. This film exhibited an a increase in index of 0.01 when 20 volts was applied (about 15 V/$\mu$m). Thus, an index change of 0.008 should be routinely achieved and was used in the calculation with the results shown in FIG. 8. (The transmitted light out the bottom of the substrate will be the amount not reflected or absorbed by the materials to make the device. For these materials, transmission from the near ultra-violet to near infra-red is possible.)

It can be seen that for a light beam of wavelength, 632.8 nm, the reflectivity of the device increases from practically zero without external field to practically one with an external field applied. Therefore, a light intensity modulation of nearly 100% could be achieved using this device. The insertion loss of the device, according to the calculation, is below one percent. Furthermore, because of the small incident angle of 11°, this device is polarization insensitive. It can also be seen that an index change much smaller than 0.008, e.g., 0.0016, will produce a substantial intensity modulation so that one may be able to use much less than 20 volts, e.g., 4 volts, and achieve useful results.

It should be understood that the calculation assumed uniform thickness films. Deviations in thickness will give less ideal results but the working example shows that these effects are, in practice, not major. It should be further understood that the light wavelengths and angles of incidence are merely examples. The wavelength is only limited by the absorption of the material. The devices will modulate unpolarized light at any angle without the use of polarizers even though, at large angles, using a polarizer on the incident beam may produce a greater modulation.

Those skilled in the art will appreciate that, although not limited to the substrates disclosed herein, since all devices can be constructed entirely of thin and thick films on compatible substrates, it would be possible to make hybrid integrated circuits using either silicon or silicon-on-sapphire technology. In this case, the voltage generators would be external to the modulator but contained on the same substrate. An array of such devices could also be constructed. Further, although modulation of reflection is the most desirable when used with integrated circuits, the device can be used in the transmission mode as well, provided the substrate material is not absorbing.

Still further, since the modulation is continuous, the devices are not limited to use as on-off switches. In particular, voltage feedback from an optical sensor could be used to linearize the modulation dependence on voltage.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for switching optical signals comprising:
   providing a substrate;
   providing a first electrical conductor that is partially light reflective and partially light transmissive over the substrate, the first electrical conductor being connected to a voltage generator;
   providing a ferroelectric film over the first electrical conductor;
   providing a second electrical conductor that is partially light reflective and partially light transmissive over the ferroelectric film, the second electrical conductor being connected to the voltage generator; and
   controlling an output of the voltage generator to provide a voltage across the ferroelectric film to switch an optical signal.

2. A method as in claim 1, wherein the ferroelectric film is a solid state ferroelectric thin film having an optical phase thickness of about an integer multiple of half a wavelength of an incident light beam.

3. A method as in claim 1, wherein the ferroelectric film includes lead lanthanum zirconium titanate.

4. A method as in claim 1, wherein the first conductor is a metal film and the second conductor includes a layer of indium-tin-oxide.

5. A method as in claim 4, wherein the step of providing a first conductor further comprises:
   providing a layer of platinum.

6. A method as in claim 4, wherein the ferroelectric film has an optical phase thickness of about an integer multiple of half the wavelength of an incident light beam.

7. A method as in claim 4, wherein the ferroelectric film includes lead lanthanum zirconium titanate.

8. A method as in claim 1, wherein the first conductor includes a dielectric stack deposited over the substrate, the dielectric stack including a plurality of alternating layers with different index of refraction materials, and wherein a transparent conducting layer including indium-tin-oxide is deposited over the dielectric stack.

9. A method as in claim 8, wherein the dielectric stack includes alternating layers of SiO2 and Ta2O5.

10. A method as in claim 8, wherein the second conductor includes a metal film.

11. A method as in claim 10, wherein the metal film includes a layer of gold.

12. A method as in claim 8, wherein the ferroelectric film is a solid state ferroelectric thin film having an optical phase thickness of about an integer multiple of half the wavelength of an incident light beam.

13. A method as in claim 12, wherein the solid state ferroelectric thin film includes lead lanthanum zirconium titanate.

14. A method as in claim 1 further comprising:
   providing the first conductor including a first dielectric stack deposited over the substrate and a first transparent conducting layer comprising indium-tin-oxide deposited over the first dielectric stack; and
   providing the second conductor including a second transparent conducting layer comprising indium-tin-oxide deposited over the ferroelectric film and a second dielectric stack deposited over the second transparent conducting layer.

15. A method as in claim 14, wherein the first dielectric stack includes alternating layers of SiO2 and Ta2O5.

16. A method as in claim 14, wherein the ferroelectric film is a ferroelectric thin film having an optical phase thickness of about an integer multiple of half the wavelength of an incident light beam.

17. A method as in claim 14, wherein the ferroelectric film includes lead lanthanum zirconium titanate.

18. A method as in claim 1, wherein the substrate includes at least one element that is selected from the group comprising silicon and sapphire.

19. A method as in claim 1 further comprising:
   disposing an integrated circuit on the substrate for controlling one or more switching devices on the substrate.

20. A method as in claim 1 further comprising:
   switching transmitted monochromatic light having a wavelength in a range from an ultraviolet to an infrared wavelength.

* * * * *